United States Patent [19]

Ogawa et al.

[11] Patent Number: 4,868,865
[45] Date of Patent: Sep. 19, 1989

[54] TERMINAL SWITCHING CONTROL APPARATUS

[75] Inventors: Fukushige Ogawa; Chiaki Motegi; Chikara Hosokawa, all of Tokyo, Japan

[73] Assignee: Kabushiki Kaisha Toshiba, Kawasaki, Japan

[21] Appl. No.: 160,844

[22] Filed: Feb. 26, 1988

[30] Foreign Application Priority Data

Feb. 27, 1987 [JP] Japan .................................. 62-44518
Mar. 13, 1987 [JP] Japan .................................. 62-58121

[51] Int. Cl.⁴ ..................... H04M 11/00; H04M 1/65
[52] U.S. Cl. ....................................... 379/100; 379/80
[58] Field of Search ........................... 379/100, 80, 105

[56] References Cited

U.S. PATENT DOCUMENTS 4,564,724 1/1986 Nakayama et al. ................. 379/100
4,639,553 1/1987 Kiguchi ............................... 379/100
4,653,086 3/1987 Laube ................................. 379/100
4,677,660 6/1987 Yoshida .............................. 379/100
4,692,817 9/1987 Theis ..................................... 379/80

FOREIGN PATENT DOCUMENTS

0242449 10/1986 Japan ................................... 379/100
2183427 6/1987 United Kingdom ................ 379/105

Primary Examiner—Jin F. Ng
Assistant Examiner—Mehdi Haghani
Attorney, Agent, or Firm—Cushman, Darby & Cushman

[57] ABSTRACT

A terminal switching control apparatus includes a controller. The controller responds to one of a record stop (RS) signal, a communication signal from a telephone, and a facsimile communication end (FCE) signal from a facsimile to monitor a call detect CED signal from a call detector. The controller determines whether the mode set by a mode setting section is a first mode or a second mode, in response to the CED signal from the call detector. In the first mode, the controller responds to a CNG detect signal from a CNG detector within a first time period and outputs a switch control (SC) signal to a switch so as to couple a communication line to the facsimile, and then responds to the communication signal upon elapse of the first time period and outputs the SC signal to the switch so as to couple the communication line to the telephone. In the second mode, the controller outputs a record start control (RSC) signal to a recording section and outputs the RS signal to the recording section upon elapse of a second time period.

16 Claims, 7 Drawing Sheets

TERMINAL SWITCHING CONTROL APPARATUS

BACKGROUND OF THE INVENTION

1. Field of the Invention

The present invention relates to a terminal switching control apparatus for use in a communication terminal apparatus equipped with a telephone, a facsimile machine, a message recorder or the like.

2. Description of the related art including information disclosed under §§ 1.97-1.99

In general, a facsimile in a communication terminal apparatus is coupled to a communication line together with a telephone, and these devices are alternatively switched by a switch to the communication line for performing their functions. There are two reception modes for facsimiles: manual and auto reception modes. In the manual mode, the switch is switched to a telephone. In this state, even if a calling signal is received, the facsimile does not function and instead a telephone bell will ring to inform a user (receiver) of a communication requested. When the receiver responds to the caller via the telephone and operates the switch to the facsimile in response to the facsimile reception request from the caller, the facsimile reception function can be performed thereafter. If however, the receiver does not operate the switch, he or she can continue the telephone communication as desired, i.e., if the reception mode is set to the manual mode, the communication terminal apparatus can continue to be used for the purpose of telephone communication.

On the other hand, if the auto reception mode is set, the calling signal is detected by a call detector. At this time, the switch is automatically switched to the facsimile from the telephone and the facsimile reception operation will take place thereafter. If this auto reception mode is set, therefore, the communication terminal apparatus can be exclusively used as a facsimile.

Facsimiles have often been used in offices or factories for use only in facsimile communication. Recently, there are more facsimiles with an auto calling function appearing and available in the market. Therefore, the facsimiles are generally used in the auto reception mode.

As the convenience of such facsimiles is understood, facsimiles are becoming popular even in ordinary stores or shops or homes. The facsimile for personal use, however, is not so frequent as in offices or factories. As a result, it is desirable that a telephone and a facsimile should be effectively switched from one to the other to allow use of facsimiles in the home.

According to conventional terminal control apparatuses, when the caller is a facsimile, the receiver should respond by means of the telephone to confirm the caller each time a call is made using its auto call function. And when the caller is confirmed to be a facsimile, the receiver should operate the switch to the facsimile. This operation is very troublesome, and when the auto reception mode is set to eliminate this inconvenient operation, upon detection of a calling signal, the facsimile reception operation is executed without conditions. This mode, therefore, does not permit the receiver to respond to a caller sending a calling signal to the receiver's telephone.

There may be an auto answering telephone attached to the communication terminal apparatus as one of the demanded multi-functions. This auto answering function may be provided in the facsimile. According to such a communication terminal apparatus in its simplest form, the telephone attached to the facsimile body serves as the auto answering telephone. If an auto answering telephone is attached to the terminal apparatus, in order to operate the auto answering telephone, the facsimile needs to be set to the manual reception mode. In the manual reception mode, however, the auto facsimile reception cannot be executed, thus restricting the functions of the facsimile.

SUMMARY OF THE INVENTION

With the above situations in mind, therefore, it is an object of this invention to provide a terminal switching control apparatus which automatically switches between a telephone and a facsimile in accordance with the communication mode requested by a caller upon detection of a calling signal, thus relieving a user of unnecessary troublesome switching operation and ensuring effective and assured use of the telephone and facsimile, and which can properly switch between these two units even when either one has an auto answering function.

The terminal switching control apparatus according to this invention includes:

- a mode setting section for setting one of first and second modes;
- a call detector, coupled to a communication line, for generating a call detect signal in accordance with a calling signal coming through the communication line; and
- a switching circuit, coupled to the communication line, for selectively coupling the communication line to a recording section, a facsimile section and a telephone in accordance with an incoming switch control signal.

The telephone generates a communication signal in response to a communication operation, and the facsimile section executes a facsimile communication through the communication line in accordance with a facsimile communication start instruction received and generates a facsimile communication end signal upon completion of the facsimile communication. A recording section records vocal sounds input through the line, in accordance with a record start instruction received, and stops the recording operation in accordance with a record stop instruction.

A calling tone (CNG) detector responds to an incoming a CNG and generates CNG detected signal. A controller first responds to the call detect signal from the call detector, outputs the switch control signal to the switching circuit so as to couple itself to the communication line and determines whether the mode set by the mode setting section is the first mode or the second mode. Finally, the controller responds to one of the communication signals from the telephone and the facsimile communication end signals from the facsimile section to monitor the call detect signal from the call detector. In the non-auto answering mode, the controller responds to the CNG detect signal from the CNG detector within a first time period and outputs the switch control signal to the switching circuit so as to couple the communication line to the facsimile section, and then responds to the communication signal from the telephone upon elapse of the first time period and outputs the switch control signal to the switching circuit so as to couple the communication line to the telephone. In the auto answering mode, the controller outputs the record start instruction to the recording section and outputs the record stop instruction thereto upon elapse of a second time period as a recording time.

It is another object of this invention to provide a facsimile with a message recording telephone, which can perform both the facsimile auto reception operation and the auto answering operation, whereby a telephone reception can be executed using the auto answering function without sacrificing the intrinsic function of the facsimile.

The terminal switching control apparatus therefore includes:

a call detector, coupled to a communication line, for generating a call detect signal in accordance with a calling signal coming through the communication line; and a switching circuit, coupled to the communication line, for selectively coupling the communication line to a recording section and a facsimile section in accordance with an incoming switch control signal.

The facsimile section executes a facsimile communication through the communication line in accordance with a facsimile communication start instruction received and generates a facsimile communication end signal upon completion of the facsimile communication. The recording section records vocal sounds input through the line, in accordance with a record start instruction received, and stops the recording operation in accordance with a record stop instruction.

A controller first responds to the call detect signal from the call detector and outputs the switch control signal to the switching circuit so as to couple itself to the communication line. The controller responds to the facsimile communication end signal from the facsimile section to monitor the call detect signal from the call detector. In addition, the controller responds to the call detect signal and sends a first facsimile communication control signal from the facsimile section on the communication line, then sends the record start instruction to the recording section, and sends the record stop instruction thereto upon elapse of a second time period as a recording time. Upon reception of a second facsimile communication control signal during the second time period, the controller sends the record stop instruction to the recording section to permit the facsimile section to perform the facsimile communication.

As described above, according to the terminal switching control apparatus of this invention, based on the presence or absence of an incoming CNG signal, it is determined whether the caller requests a facsimile communication through auto calling or a telephone communication through a telephone, and switching between the receiver's facsimile and telephone is automatically done in accordance with the decision. Therefore, if the caller is an auto-calling facsimile, the facsimile communication can be performed in an auto reception mode without requiring a user's manual operation, and if the caller is a telephone, the user can assuredly respond to the caller over the telephone.

If no off-hook operation is conducted by the user even upon elapse of a predetermined time after a telephone calling has started, the switch is automatically switched to the facsimile control section so as to provide assured response even to a facsimile communication request done through manual calling by the caller.

Further, in the auto answering mode, when the caller is a facsimile, irrespective of auto calling or manual calling, the presence or absence of an incoming CNG signal is detected and the switch is switched to the facsimile after performing the recording operation for a given period of time, thus assuredly making the receiver ready for facsimile reception.

Furthermore, during the period in which the communication mode requested by the caller is being determined, a message indicating the receiver's operation mode or a pseudo ring back tone is sent to the caller. This can reduce the uncertainty about the absence of the receiver which the caller may feel during calling and make the caller stay on the line until the proper switching control is performed.

When a recorder is set to function first upon reception of a CNG signal, the receiver can talk to the caller requesting telephone communication, or if it is determined that facsimile communication is requested, the telephone communication operation is stopped to be ready for the requested facsimile communication. This can prevent the caller from hearing an unpleasant high tone generated in the facsimile communication and can therefore realize the effective use of an auto answering telephone and a facsimile over a single communication line.

DETAILED DESCRIPTION OF THE PREFERRED EMBODIMENTS

Terminal switching control apparatuses according to preferred embodiments of this invention will be explained below, in conjunction with the accompanying drawings.

Figure 1:
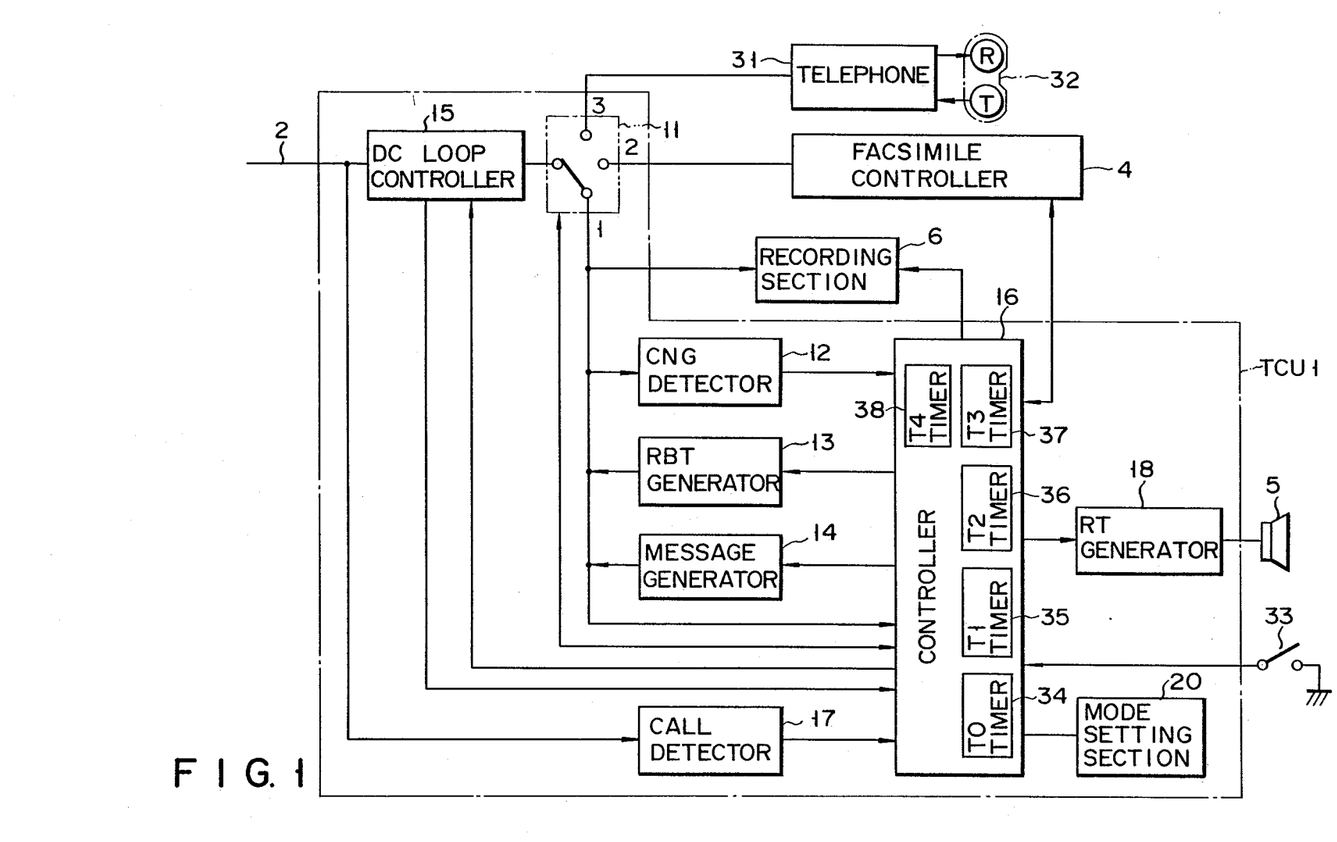
FIG. 1 is a block diagram of the structure of a terminal switching control apparatus according to a first embodiment of this invention.

To begin with, referring to FIG. 1, the structure of the terminal switching control apparatus (TCU) according to the first embodiment of this invention will be explained. In FIG. 1, a circuit section such as a dial pulse generator, necessary for initiating the calling, and those sections in a facsimile other than a facsimile controller are omitted for explanatory simplicity.

In FIG. 1, TCU 1 has controller 16 which is mainly constituted by a microprocessor and performs the overall control of the apparatus. Controller 16 has timers 34, 35, 36, 37 and 38, which respectively measure time periods T0, T1, T2, T3 and T4. Switch 11, which is also included in TCU 1, has three switching nodes and is switched between these nodes in accordance with a switch control signal from controller 16, to establish a channel. The common node of switch 11 is coupled to a subscriber line 2 through DC loop controller 15. This controller 15 forms a DC loop of subscriber line 2 in accordance with a loop-form control signal from controller 16 and sends a disconnect signal to controller 16 when a caller terminates the communication.

Of the three switching nodes of switch 11, node 3 is coupled to telephone 31 equipped with a hand set 32. Switch 33 is interlocked with the hook set so that it is closed when hand set 32 is off-hooked. During on-hook of hand set 32, therefore, a telephone communication signal is supplied to controller 16. Node 2 is coupled to facsimile controller 4. This controller 4 controls the facsimile communication in accordance with a facsimile communication start instruction from controller 16 and sends a facsimile communication end signal to controller 16 upon completion of the facsimile communication. Node 1 is coupled to CNG (calling tone) detector 12, RBT (ring back tone) generator 13 and message generator 14, which are all included in TCU 1. Node 1 is also coupled to TCU 1 directly.

CNG detector 12 detects CNG sent from the caller's terminal after a calling signal is detected. Upon detection of the CNG, detector 12 sends a CNG detect signal to controller 16. RBT generator 13 generates a pseudo ring back tone (RBT) in response to a RBT generation instruction from controller 16 and sends the RBT to the caller's terminal. Message generator 14 generates a voice message indicating the currently-specified operation mode in response to a message generation instruction from controller 16 and sends the message to the caller's terminal. There are two operation modes set by a mode setting section 20: a non-auto answering mode in which either a telephone reception or a facsimile reception is possible and an auto answering mode in which an auto answering operation is first initiated and the facsimile reception can be initiated upon reception of the CNG detect signal.

TCU 1 further includes call detector 17 and ring tone (RT) generator 18. Call detector 17 detects a 16 Hz calling signal incoming through subscriber line 2 from an exchanger (not shown) in a wait state. Upon detection of the calling signal, detector 17 sends out a call detect signal to controller 16. RT generator 18 generates a signal for telephone calling in accordance with a ring instruction from controller 16 and generates ring tone through a speaker 5 to inform a user of the telephone calling.

Recording section 6 is also coupled to node 1 and records an incoming analog voice signal in accordance with a record start instruction from controller 16. This recording section 6 may be a recording device such as a tape recorder or may be constituted by an encoder and a RAM. This RAM may be the one provided in the facsimile.

Figure 2A:
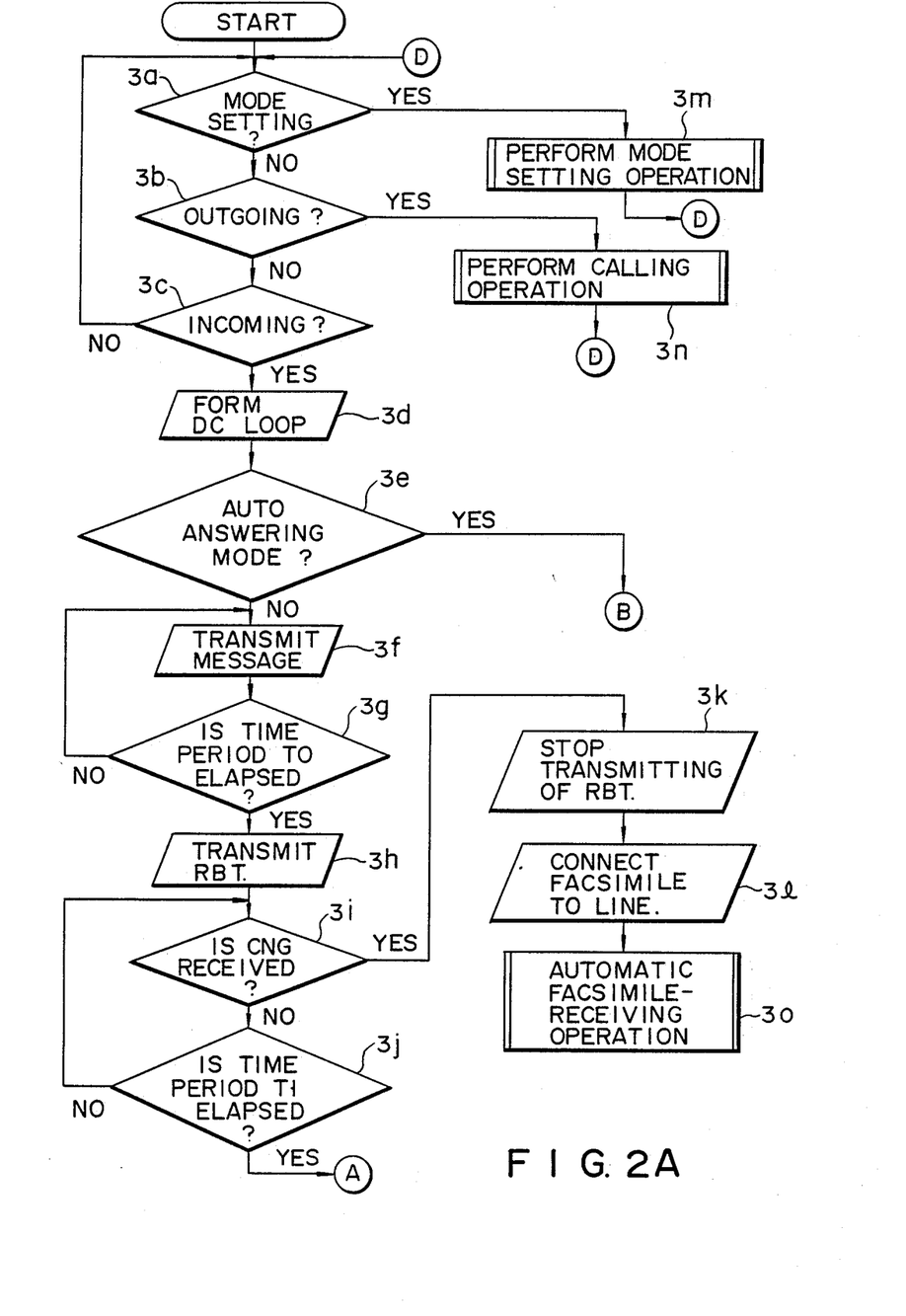
FIGS. 2A through 2C are flowcharts for explaining the operation of the first embodiment.
Figure 2B:
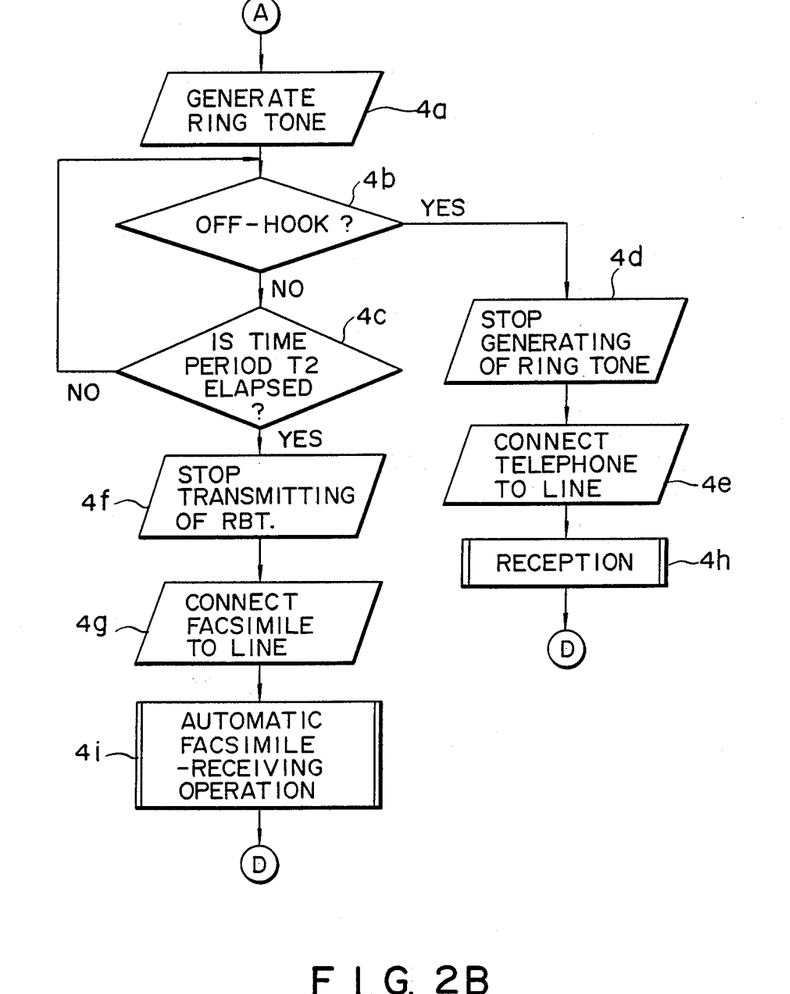
Figure 2C:
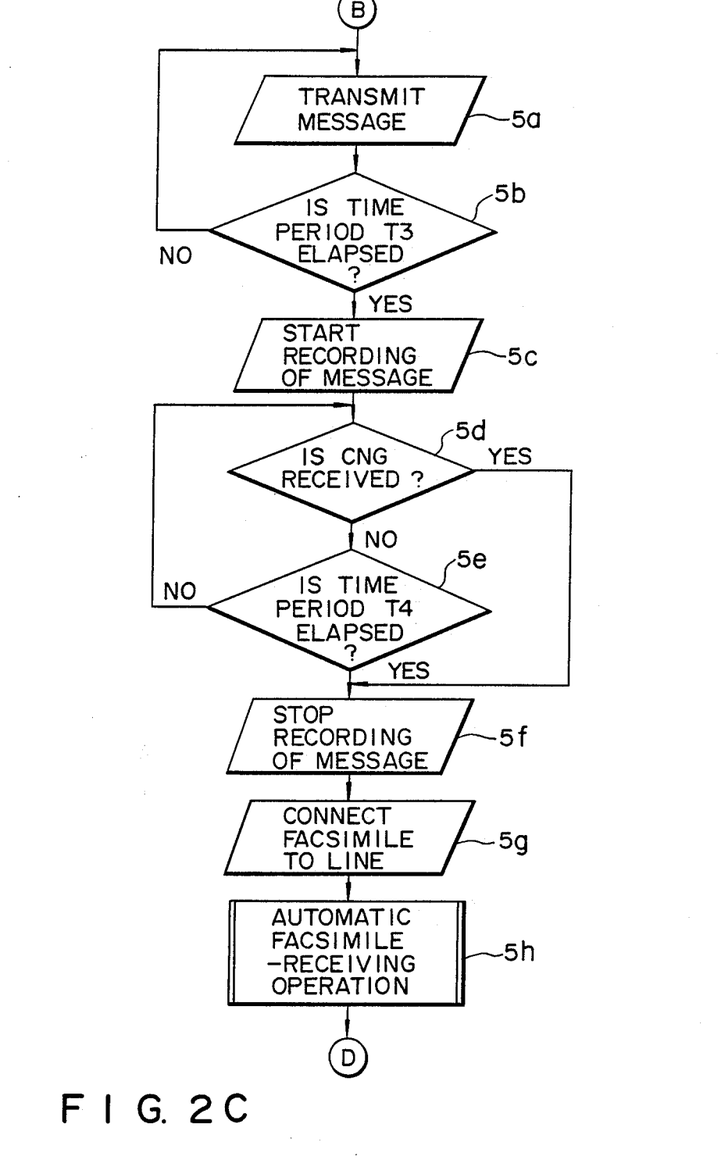

Referring now to FIGS. 2A to 2C, the operation of TCU 1 according to the first embodiment will be explained.

In a wait state, steps 3a to 3c are repeated and in these steps it is determined whether or not a mode setting key (not shown) of mode setting section 20 is operated, whether or not the calling operation is to be performed and whether or not an incoming calling signal is received. When controller 16 detects in step 3a that the mode setting key is operated in the wait state, a mode setting operation is executed in step 3m. Assume now that the non-auto answering mode has been set. If it is determined in step 3b that hand set 32 is off-hooked, a communication signal is input to controller 16. In response to this signal, controller 16 sends the switch control signal to switch 11 to connect the common node to node 2. Accordingly, a calling operation is executed in step 3n and communication will be made as a consequence. When the end of communication is detected from the communication signal, controller 16 sends the switch control signal to switch 11 to connect the common mode to node 1. When call detector 17 detects an incoming calling signal, the process advances to step 3d; otherwise, the process returns to step 3a.

When a calling signal of 16 Hz sent from the exchanger over line 2 is detected by call detector 17 in step 3c in the wait state, the call detect signal is output to controller 16 and step 3d is executed. In step 3d, DC loop controller 15 forms a DC loop of subscriber line 2 in accordance with the loop-form control signal from controller 16. This couples the caller and receiver through the exchanger.

In step 3e, the currently-set operation mode is determined. As the non-auto answering mode is currently set, the decision in this step is negative (N) and the subsequent step 3f will be executed. If the decision in step 3e is affirmative (Y), then step 5a (FIG. 2c) will be executed.

In step 3f, controller 16 sends out the message generation instruction to message generator 14 and timer 34 is started. In response to this instruction, message generator 14 generates a voice message indicating that the non-auto answering mode is set, and the generated message is sent on line 2 through switch 11 and controller 15. As a result, the caller is informed that either telephone or facsimile communication is available on the receiver side. In step 3g, time period T0, e.g., 10 seconds, during which the message is being output, is measured by timer 34. If it is determined in step 3g that 10 seconds have elapsed, the transmission of the voice message is stopped and step 3h will be executed next. During period T0, a ring back tone (RBT) has been conventionally fed back to the caller; in this embodiment, however, a message is transmitted to the caller instead.

Figure 5A:
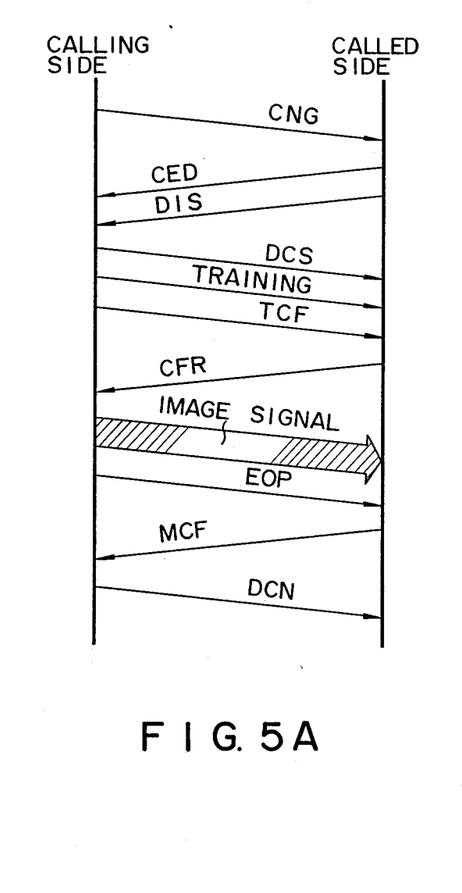
FIGS. 5A and 5B are sequence diagrams illustrating a facsimile communication and a telephone communication.

In step 3h, the RBT generation instruction is output to generator 13, which in turn generates and sends the pseudo ring back tone RBT to line 2 through switch 11 and controller 15. Consequently, the caller is informed that TCU 1 is called. At this time, timer 35 is started in step 3i and controller 16 monitors the elapsing of a given time period T1, e.g., 10 seconds, in step 3j. During the time period T1, in step 3i, reception of the CNG from the caller is monitored based on the CNG detect signal from CNG detector 12. Here, the CNG signal is the first signal output from the caller's facsimile before initiating in the facsimile control sequence when the caller's facsimile auto-calls, as shown in FIG. 5A, and is output for 0.5 second at a frequency of 1100 Hz and is interrupted for 3 seconds.

If, in this state, the reception of the CNG signal is detected within the given time T1, it is determined that the caller is a facsimile and the flow advances to step 3k from step 3i. In step 3k, controller 16 causes generator 14 to stop sending the pseudo ring back tone RBT. Then, a flow advances to step 3l where the controller 16 sends the switch control signal to switch 11 to connect the common node to facsimile controller 4. Also, the facsimile communication start instruction is output to controller 4. As a result, in step 30, facsimile controller 4 is coupled to subscriber line 2 and the facsimile communication is thereafter performed between the caller's facsimile and the receiver's facsimile in accordance with a known facsimile control sequence, as shown in FIG. 5A. That is, the automatic facsimile-receiving operation is executed. Therefore, the user need not to perform any switching operation to the terminal apparatus.

When no CNG signal is detected within the given time period T1, controller 16 determines that the caller is a telephone and initiates the flowchart as shown in FIG. 2B. First, in step 4a, controller 16 sends out the ring instruction to RT generator 18 and starts timer 36. Generator 18 generates a ring tone signal so that a ring tone RT is output from speaker 5. In the subsequent step 4b, the off-hook operation of hand set 32 is monitored on the basis of the telephone communication signal.

Figure 5B:
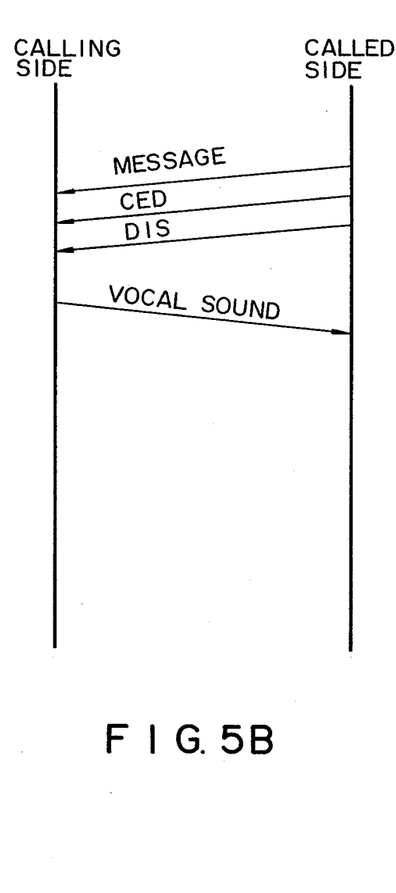

In this state, if the user picks up hand set 32 noticing the ring tone, controller 16 determines through switch 33 that the user is going to talk on the phone. As a result, the ring tone is stopped in step 4d and controller 16 sends the switch control signal to switch 11 so as to connect the common node to node 3 in step 4e. This couples telephone 31 to subscriber line 2. Thereafter, telephone communication is performed between telephone 31 and the caller's telephone (step 4h), as shown in FIG. 5B. That is, the switching to the telephone is also automatic in this case. Therefore, if the caller is a telephone, the user can assuredly respond to the caller through the same operation as is done with ordinary telephones. It should be noted here that the ring tone informing the user of the incoming call is generated upon elapse of time periods T0 and T1 after the calling signal is actually received. No information is given to the user until then.

When the end of the telephone communication is confirmed by the telephone communication signal, controller 16 sends the switch control signal to switch 11 to couple line 2 to node 1 and returns to step 3a.

It is determined whether any off-hook operation is done during a given time T2, e.g., 20 seconds, after the generation of the ring tone in step 4a. When no off-look operation is done within this time period T2 (step 4c), it is determined that the user is absent and the flow advances to the subsequent step 4f. In other words, the caller may be requesting the facsimile communication through the manual calling, so that upon elapse of the given time period T2, the flow advances to step 4f where the pseudo ring back tone RBT and the ring tone are stopped. Then, the switch control signal is sent to switch 11 to switch the common node to facsimile controller 4 in step 4g. As a result, subscriber line 2 is coupled to controller 4. In addition, controller 4 receives the facsimile communication start instruction and thus sends a CED (called station identification) signal to the caller as shown in FIG. 5A. Thereafter, the facsimile communication can be performed (step 4i), as shown in FIG. 5A. Thus, if the caller has been requesting the facsimile communication through the manual calling, therefore, the user on the caller side can confirm this CED signal and can initiate the facsimile communication thereafter.

When the facsimile communication is ended, controller 4 sends the facsimile communication end signal to controller 16, which in turn sends the switch control signal to switch 11 to couple line 2 to node 1.

If the operation mode of TCU 1 is set to the auto answering mode, the flowchart as shown in FIG. 2C will be executed. When, after the forming of the DC loop of subscriber line 2 in step 3d, it is determined in step 3e that the auto answering mode has been set, the flow advances to step 5a where controller 16 sends the message generation instruction to message generator 14 and starts timer 37. In response to this instruction, message generator 14 generates a voice message indicating that the auto answering mode is set, and sends it over line 2 to the caller. The content of this message differs from that of the message generated in step 3f. The transmission of the message continues for a given time period T3, e.g., 10 seconds. When elapse of the time period T3 is detected in step 5b, the flow advances to step 5c where controller 16 sends the record start instruction to recording section 6 to start the function of the recording section 6 and starts timer 38. As a result, recording section 6 records, for example, a speech made by the user on the caller side.

In addition to the recording control, the reception of the CNG signal is monitored by detector 12 in step 5d. When the reception of the CNG signal is detected within a given time period T4, e.g., 20 seconds (step 5e) and the CNG detect signal is sent to controller 16 from detector 12, it is determined that the caller is a facsimile and the flow advances to step 5f. In step 5f, the record stop instruction is sent to recording section 6 and the recording section stops its recording function. Then, in step 5g controller 16 sends the switch control signal to switch 11 to connect the common node to node 2 that is coupled to controller 4. Controller 4 is also supplied with the facsimile communication start instruction. Consequently, the facsimile auto reception is carried out thereafter in step 5h. Even in the auto answering mode, therefore, the facsimile communication can be assuredly made with the caller being facsimile. In this case, the user also need not perform any switching operation.

When the facsimile communication is completed, as described above, the facsimile communication end signal is sent to controller 16 and line 2 is coupled to node 1.

If the caller aborts the call during each switching control operation mentioned above, controller 16 detects this event from the output of a polarity inversion detector (not shown) provided in DC loop controller 15, i.e., from a disconnection signal, and stops the control operation at that time and returns to the wait state.

The present invention is not limited to the above embodiment. For instance, the pseudo ring back tone may be replaced with another type of tone signal or a voice message that indicates the call being made. Further, when the communication mode requested by the caller is discriminated, the result may be displayed on a display or may be stored in a memory as a communication record each time. The above embodiment has been explained with reference to a communication terminal apparatus in which the facsimile, the telephone and the recording device with the auto answering function are independently provided. However, a telephone with the auto answering function may be integrated in the facsimile. Furthermore, the switching control sequence and the contents of the control, the operation mode informing means and the call discriminating/detecting means can be modified in various manners without departing from the scope of the invention.

In the above embodiment, line 2 is switched to node 1 upon completion of a communication. However, line 2 may be coupled to node 1 when a call detect signal is detected. Also, if the CNG detector, the RBT and message generators, and the controller 16 are directly coupled to line 2, line 2 may be coupled to equipment to be communicated with when a communication is started. Also, in the above embodiment, line 2 is coupled to telephone 31, facsimile controller 4, or recording section 6 by switch 11 in accordance with the switch control signal from controller 16. However, these three devices may be connected to controller 16 and may be activated by a signal from the controller, respectively. In this case, switch 11 can be omitted, and line 2 is connected to controller 16.

Figure 3:
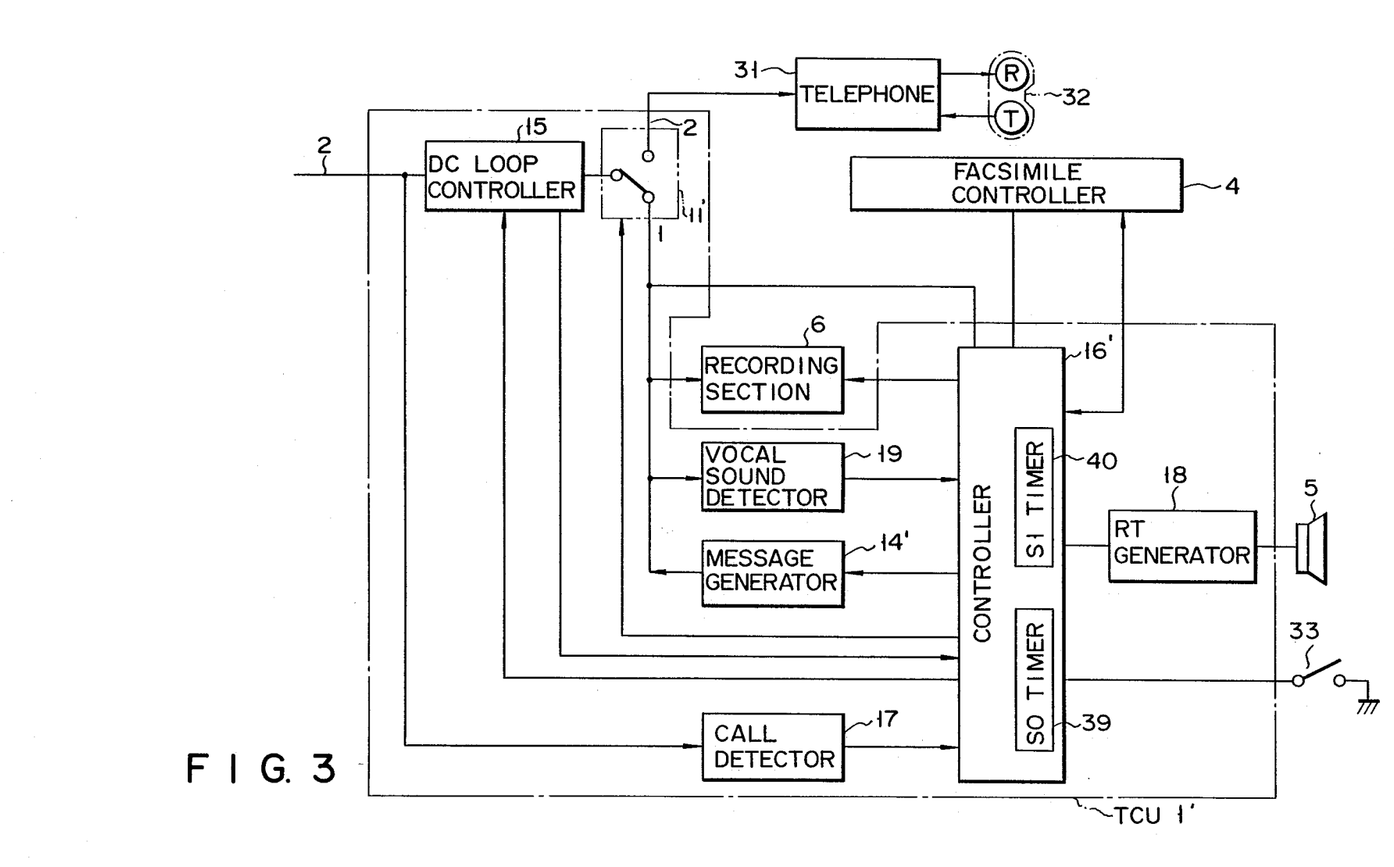
FIG. 3 is a block diagram of the structure of a terminal switching control apparatus according to a second embodiment of this invention.
Figure 4:
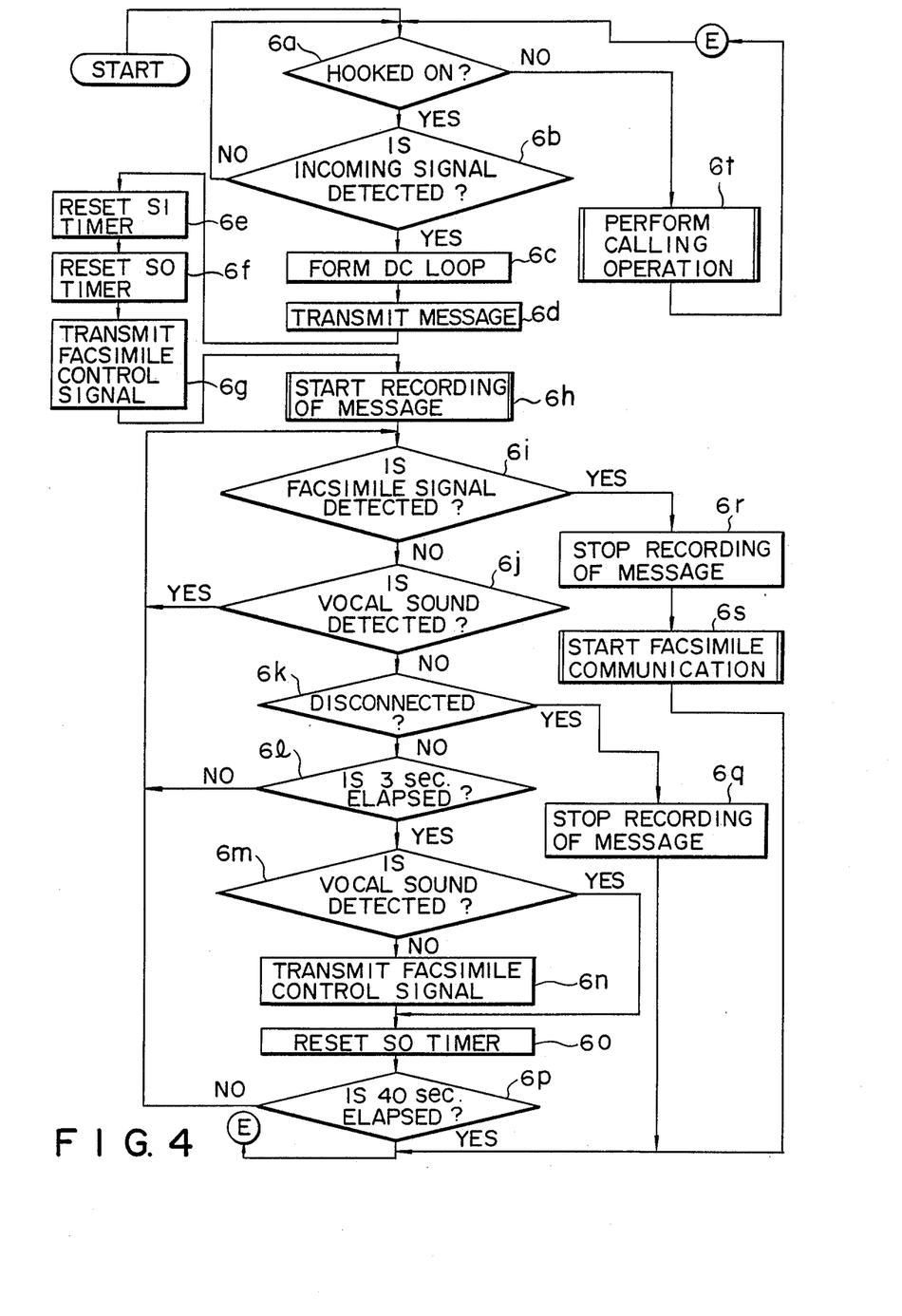
FIG. 4 is a flowchart for explaining the operation of the second embodiment.

Referring now to FIGS. 3 and 4, a terminal switching control apparatus according to the second embodiment of this invention will be explained.

To being with, the structure of the second embodiment will be explained below, referring to FIG. 3. The structure of the second embodiment is mainly the same as that of the first embodiment, so that only the differences will be discussed here. Due to the difference in the operation control, controller 16 is changed to controller 16'. Controller 16' has an S0 timer 39 and an S1 timer 40 in place of timers 34 to 38. A message generator 14', replacing message generator 14, is coupled between node 1 and switch 11' and controller 16'. Switch 11' has node 1 coupled to facsimile controller 4 through controller 16' and node 2 coupled to telephone 31.

Message generator 14' generates a message different from the one produced by message generator 14, in accordance with the message generation instruction from controller 16'. RBT generator 13 is not used in the second embodiment, but a vocal sound detector 19 is instead coupled between node 1 of switch 11' and controller 16'. Detector 19 detects the presence of an analog signal on line 2 as a voice signal and sends a voice detect signal to controller 16'.

The operation of the second embodiment will now be explained referring to FIG. 4.

In the wait states in steps 6a and 6b, controller 16' is monitoring the off-hook of hand set 32 through switch 33. When hand set 32 is off-hooked, the calling operation is performed in step 6t. That is, the same operation as is done in step 3m of FIG. 2A is performed.

When reception of a 16 Hz calling signal from an exchanger (not shown) is detected by call detector 17 while hand set 32 is in the on-hook state, the call detect signal is sent to controller 16' in step 6c. Controller 16' sends the loop-form control signal to DC loop controller 15 to lock on subscriber line 2. In the subsequent step 6d, controller 16' sends the message generation instruction to message generator 14', which in turn sends a message to the caller through switch 11' and controller 15, as shown in FIG. 5B. Then, S1 timer 40, which measures the elapse of, for example, 40 seconds, is reset in step 6e. In step 6f, S0 timer 39 which measures the elapse of, for example, 3 seconds is reset. Then, in step 6g controller 16' sends the facsimile control sequence signal to the caller. This corresponds to the transmission of the CED (called station identification) signal and DIS (digital identification signal) signal in FIG. 5A. In the next step 6h, controller 16' sends the record start instruction to recording section 6 and this recording section 6 starts recording a vocal sound received, as shown in FIG. 5B.

After the recording operation has started, S0 timer 39 measures 3 seconds in step 6l. During this measuring operation, it is determined in steps 6i and 6j whether an incoming signal received over line 2 is a DCS (digital command signal) generated in response to the facsimile control sequence signal, or a voice signal as an analog signal or a non-vocal sound signal generated upon depression of the start switch of the facsimile on the caller side. It is also checked in step 6k if the communication is interrupted. When it is detected by detector 19 that the analog signal is being input, the recording operation continues. When it is determined in step 6l that 3 seconds has been elapsed, the flow advances to the next step 6m where it is determined whether or not a voice signal is detected by detector 19. When the voice detect signal is input, the flow advances to step 6o where S0 time 39 is reset. When the voice detect signal is not detected, the flow advances to step 6n where the facsimile control sequence signal is sent to the caller. Thereafter, step 6o is executed. In the subsequent step 6p, it is determined whether or not 40 seconds have elapsed. If the decision here is negative, the flow returns to step 6i, and if it affirmative, the flow returns to step 6a.

When communication interruption is detected by a disconnect signal from controller 15 in steps 6i to 6l, controller 16' sends the record stop instruction to recording section 6 in step 6q, thereby stopping the recording operation. Then, the flow returns to step 6a.

When reception of the DCS signal as shown in FIG. 5A is detected in steps 6i to 6l, the recording operation is stopped in step 6r in the same manner as has been explained, and the facsimile communication start instruction is sent to controller 4 in order to initiate in the facsimile communication. Then, the facsimile communication is performed as shown in FIG. 5A (step 6s). Upon completion of the facsimile communication, the facsimile communication end signal is sent to controller 16' from controller 4, and the flow returns to step 6a.

As has been explained above, according to this embodiment, since recording section 6 is first operated when a call is detected, if telephone communication is requested by the caller, such communication can be made. If, on the other hand, it is found that the caller has intended facsimile communication, the operation for making the telephone communication can be stopped to cope with the intended action. Therefore, the caller does not hear an unpleasant high tone signal which is generated in facsimile communication, and the auto answering telephone can be used with the facsimile.

If the caller aborts the calling operation during each switching control operation described above, controller 16' detects this event by a disconnect signal output from a polarity inversion detector (not shown) provided in DC loop controller 15, and stops the control operation at that time and returns to the wait state.

Since the flowchart shown in FIG. 4 has many portions similar to the flowcharts shown in FIGS. 2A to 2C, if the CNG detector and the RBT generator are further provided in the second embodiment, the flowchart of FIG. 4 may be incorporated in those shown in FIGS. 2A to 2C. In this case, steps 6g, 6h to 6s need to be executed in place of steps 5c to 5h, and steps 6g, 6i to 6p in place of steps 3i to 3j.

The present invention is not limited to the above embodiment. For instance, an RBT generator may be provided to send a pseudo ring back tone or the pseudo ring back tone may be replaced with another type of tone signal or a voice message that indicates the call being made. Further, when the communication mode requested by the caller is discriminated, the result may be displayed on a display or may be stored in a memory as a communication record each time. The above embodiment has been explained with reference to a facsimile which incorporates a telephone with the auto answering function. However, the second embodiment can apply to a communication terminal apparatus in which the facsimile, the telephone and the recording device with the auto answering function are independently provided. Furthermore, the switching control sequence and the contents of the control can be modified in various manners without departing from the scope of the invention.

What is claimed is:

1. A terminal switching control apparatus comprising:
   a telephone for generating a communication signal in response to the performance of a telephone communication through a first channel and a communication line;
   a facsimile for executing a facsimile communication through a second channel and said communication line in accordance with a facsimile communication start instruction input thereto, and for generating a facsimile communication ends signal upon completion of said facsimile communication;
   recording means for recording communication data input through a third channel and said communication line, in accordance with a record start instruction input thereto, and for stopping a recording operating in accordance with a record stop instruction input thereto;
   channel establish means for selectively establishing one of said first channel between said communication line and said telephone, said second channel between said communication line and said facsimile, and said third channel between said recording means and said communication line, in accordance with an establish instruction input thereto;
   call detector means for generating a call detect signal in accordance with a calling signal input through said communication line;
   mode setting means for setting one of first and second modes;
   calling tone (CNG) detector means for generating a CNG detect signal in response to a CNG signal input through said communication line; and
   control means for monitoring said call detect signal from said call detector means in accordance with one of said record stop instruction, said communication signal from said telephone and said facsimile communication end signal from said facsimile, and for determining whether said first mode of said second mode is set by said mode setting means in accordance with said call detect signal from said call detector means; for outputting said facsimile communication start instruction to said facsimile, outputting said establish instruction to said channel establish means to establish said second channel in response to said CNG detect signal from said CNG detector means within a first time period, and for outputting said establish instruction to said channel establish means to establish said first channel to enable said telephone communication in response to elapse of said first time period, when it is determined that said first mode is set; and for outputting said record start instruction to said recording means and said establish instruction to said channel establish means to establish said third channel, and generating and outputting to said recording means said record stop instruction, in accordance with elapse of a second time period when it is determined that said second mode is set.

2. The apparatus according to claim 1, wherein said control means further comprises:
   means for outputting said establish instruction to said channel establish means to establish said second channel outputting said facsimile communication start instruction to said facsimile, when said telephone communication is not performed within a third time period after elapse of said first time period.

3. The apparatus according to claim 1, wherein said control means further comprises:
   means responsive to one of said CNG detect signal within said second time period and elapse of said second time period, for outputting said record stop instruction to said recording means, said establish instruction to said channel establish means to establish said second channel, and said facsimile communication start instruction to said facsimile.

4. The apparatus according to claim 3, wherein said control means further comprises:
   means for outputting said facsimile communication start instruction to said facsimile and said establish instruction to said channel establish means to establish said second channel when said telephone communication is not performed within a third time period after elapse of said first time period.

5. The apparatus according to claim 1, further comprising message generating means for transmitting through said communication line a first message to indicate that said first mode is set, during a fourth time period, in response to a first message generation control signal input thereto and a second message to indicate that said second mode is set, during a fifth time period, in response to a second message generation control signal input thereto; and
   wherein said control means further comprises means for outputting said first message generation control signal to said message generating means before said first time period when it is determined that said first mode is set, for starting said first time period after elapse of said fourth time period, for outputting said second message generation control signal to said message generating means before said second time period when it is determined that said second mode is set, and for starting said second time period after elapse of said fifth time period.

6. The apparatus according to claim 1, further comprising ring back tone (RBT) generating means for generating a ring back tone in response to a RBT generation control signal and for transmitting said generated ring back tone through said communication line; and
   wherein said control means further comprises means for, when it is determined that said first mode is set, outputting said RBT generation control signal to said RBT generating means during said first time period or until said CNG detect signal is input from said CNG detector means.

7. A terminal switching control apparatus comprising:
   a facsimile for executing a facsimile communication through a communication line in response to a facsimile communication start instruction input thereto and for generating a facsimile communication end signal upon completion of said facsimile communication;
   recording means for recording communication data input through said communication line in accordance with a record start instruction input thereto, and for stopping a recording operation in accordance with a record stop instruction input thereto;

call detector means for generating a call detect signal in accordance with a calling signal input through said communication line;

data detector means for detecting that said communication data is being input through said communication line, and for generating a data detect signal; and control means for outputting a first facsimile control signal through said communication line once during a first time period, in response to said call detect signal from said call detector means, said first time period being repeated within a second time period, for outputting said record start instruction to said recording means, for outputting said record stop instruction to said recording means upon elapse of said second time period, for outputting said record stop instruction to said recording means and said facsimile communication start instruction to said facsimile in accordance with a second facsimile control signal input through said communication line during said second time period, for outputting said record stop instruction to said recording means in response to inactivation of said data detect signal output from said data detector means during said record second time period, and for monitoring said call detect signal from said call detector means in response to one of elapse of said second time period and said facsimile communication end signal from said facsimile.

8. The apparatus according to claim 7, further comprising message generating means for transmitting a message through said communication line in response to a message generation instruction input thereto; and wherein said control means further comprises means for outputting said message generation instruction to said message generating means in response to said call detect signal, before said second time period.

9. A terminal switching control apparatus comprising:

a facsimile for executing a facsimile communication through a communication line in response to a facsimile communication start instruction input thereto, and for generating a facsimile communication end signal upon completion of said facsimile communication;

recording means for recording communication data input through said communication line in accordance with a record start instruction input thereto, and for stopping a recording operation in accordance with a record stop instruction input thereto;

call detector means for generating a call detect signal in accordance with a calling signal input through said communication line;

data detector means for detecting that said communication data is being input through said communication line, and for generating a data detect signal; and control means for outputting said record start instruction to said recording means in response to said detect signal from said call detector means, for outputting said record stop signal to said recording means and said facsimile communication start instruction to said facsimile upon elapse of a first time period, and for monitoring said call detect signal from said call detector means in response to said facsimile communication end signal from said facsimile.

10. The apparatus according to claim 9, further comprising CNG (calling tone) detector means for generating a CNG detect signal in response to a CNG signal input through said communication line; and wherein said control means further comprises means for outputting said record stop signal to said recording means and said facsimile communication start instruction to said facsimile in response to said CNG detect signal from said CNG detector means during said first time period.

11. The apparatus according to claim 9, further comprising message generating means for transmitting a message through said communication line in response to a message generation control signal input thereto; and wherein said control means further comprises means for generating said message generation control signal before beginning of said first time period, and for starting said first time period after transmitting said message.

12. A terminal switching control apparatus comprising:

a telephone for generating communication signal in response to the performance of a telephone communication through a first channel and a communication line;

a facsimile for executing a facsimile communication through a second channel and said communication line in accordance with a facsimile communication start instruction input thereto, and for generating a facsimile communication end signal upon completion of said facsimile communication;

recording means for recording communication data input through said communication line, in accordance with a record start instruction input thereto, and for stopping a communication data recording operation in accordance with a record stop instruction input thereto;

channel establish means for selectively establishing one of said first channel between said communication line and said telephone, said second channel between said communication line and said facsimile, and said third channel between said communication line and said recording means, in accordance with an establish instruction input thereto;

call detector means for generating a call detect signal in accordance with a calling signal input through said communication line;

mode setting means for setting one of first and second modes;

data detector means for detecting that said communication data is being input through said communication line, and for generating a data detect signal; and control means including first means for monitoring said call detect signal from said call detector means in response to one of said record stop instruction, said communication signal from said telephone, and said facsimile communication end signal from said facsimile and for determining whether said first mode or said second mode is set by said mode setting means, in response to said call detect signal from said call detector means; means, when it is determined by said first means that said first mode is set, for outputting a first facsimile control signal through said communication line once every first time period repeated within a second time period, for outputting said establish instruction to said channel establishment means to establish said second channel and said facsimile communication start instruction to said facsimile, in response to a second facsimile control signal input through said communication line within said second time period, and for outputting said establish instruction to said channel establishment means to establish said first channel to enable said telephone communication in response to elapse of said second time period; and means, when it is determined by said first means that said first mode is set, for outputting said record start instruction to said recording means and said establish instruction to said channel establishment means to establish said third channel, for outputting said first facsimile control signal through said communication line once every third time period repeated within a fourth time period, and for generating and outputting to said recording means said record stop instruction in response to elapse of said fourth time period.

13. The apparatus according to claim 12, wherein said control means further comprises:
means for outputting to said facsimile said establish instruction to said channel establishment means to establish said second channel and said facsimile communication start instruction when said telephone communication is not performed within a fifth time period after elapse of said second time period.

14. The apparatus according to claim 12, wherein said control means further comprises:
means for outputting said record stop instruction to said recording means, said establish instruction to said channel establishment means to establish said second channel, and said facsimile communication start instruction to said facsimile, in response to said second facsimile control signal input through said communication line within said fourth period.

15. The apparatus according to claim 12, further comprising message generating means for transmitting through said communication line a first message indicating that said first mode is set, during a sixth time period, in response to a first message generation control signal input thereto and a second message indicating that said second mode is set, during a seventh time period, in response to a second message generation control signal input thereto; and
wherein said control means further comprises means for outputting said first message generation control signal to said message generating means before said second time period when it is determined that said first mode is set, for starting said second time period after said sixth time period, for outputting said second message generation control signal to said message generating means before said fourth time period when it is determined that said second mode is set, and for starting said fourth time period after said seventh time period.

16. The apparatus according to claim 12, further comprising RBT generating means for generating a ring back tone in response to a RBT generation control signal input thereto, and for transmitting said generated ring back tone through said communication line; and
wherein said control means further comprises means for outputting said RBT generation control signal to said RBT generating means during said second time period or until said second facsimile control signal is input through said communication line, when it is determined that said first mode is set.

* * * * *